United States Patent

[11] 3,609,451

[72] Inventors Raymond G. Edgerly, Jr.
Bristol;
Peter J. Zanini, Jr., Avon, both of Conn.
[21] Appl. No. 706,128
[22] Filed Feb. 16, 1968
[45] Patented Sept. 28, 1971
[73] Assignee The Superior Electric Company
Bristol, Conn.

[54] AUTOMATIC ILLUMINATION CONTROL SYSTEM RESPONSIVE TO TOTAL ILLUMINATION
2 Claims, 4 Drawing Figs.
[52] U.S. Cl. .................................................. 315/151,
250/205, 315/158
[51] Int. Cl. ....................................................H05b 37/02,
H05b 41/36, H05b 34/64
[50] Field of Search........................................... 315/151,
159, 158; 250/205, 210

[56] References Cited
UNITED STATES PATENTS
| | | | |
|---|---|---|---|
| 2,779,897 | 1/1957 | Ellis............................. | 315/151 |
| 2,882,450 | 4/1959 | McCabe....................... | 315/151 |
| 3,128,384 | 4/1964 | Nelson et al. ................ | 250/205 |
| 3,431,464 | 3/1969 | Brischinik .................... | 250/205 X |
| 2,269,324 | 1/1942 | Turner et al. ................ | 315/151 |
| 3,344,310 | 9/1967 | Nuckolls ...................... | 315/158 X |

Primary Examiner—Robert Segal
Attorney—Johnson & Kline

ABSTRACT: A system for sensing the total amount of illumination in an area from both uncontrolled and controlled sources and automatically adjusting the amount of artificial light supplied to maintain a substantially constant value of total illumination and in which the system enables the relative adjusting of the importance of the uncontrolled light to the controlled light that is being sensed to reduce the effect of abnormal conditions caused by the uncontrolled light on the system.

PATENTED SEP28 1971

INVENTORS
Raymond G. Edgerly, Jr.
Peter J. Zanini, Jr.
BY
Johnson and Kline
ATTORNEYS

AUTOMATIC ILLUMINATION CONTROL SYSTEM RESPONSIVE TO TOTAL ILLUMINATION

In U.S. Pat. Nos. 2,882,450 and 3,128,384, both assigned to the assignee of the present invention, there are disclosed systems for providing automatic control of the total quantity of light in an area, such as a room. The light may result from an artificial source located in the area and controlled by the system and also from exterior sources, such as sunlight or artificial light not controlled by the system. Both systems sense the total quantity of light present and adjust the quantity supplied by the artificial source in order to maintain the total amount of illumination in the area substantially constant. The total quantity of illumination is sensed by the use of a photocell which may be either voltaic or conductive and which varies one of its characteristics with the amount of light that it receives.

Generally the photocell is quite small in size and is located approximately in the middle of the area though tending to be nearer a window wall than an interior wall. As such, it is not only responsive to the total illumination in the area but it is also very easily effected by an abnormal condition which causes it to receive more light than that which is present throughout the area. One abnormal condition occurs when a strong light such as sunlight is reflected by an article in the room onto the photocell. The cell inherently is responsive to light impinging on it, and thus it signals that the area has too much light and hence the amount of artificial light supplied should be decreased. But as the controlled light is supplied relatively uniformly over the area, this change will cause the area to be darker than that desired. Another example of an abnormal condition is where other light source, such as a table lamp, is located in the area but is independent of control by the system. If it is placed with respect to the photocell, as for example directly under it, it has an abnormal effect on the cell's response as compared to the light it produces for the remainder of the area. Again, the photocell would provide a signal to decrease the controlled light when such a lamp is turned on which would make the remainder of the room darker than desired.

It is accordingly an object of the present invention to provide a system for automatically adjusting the quantity of light from a controlled artificial source in an area to maintain total illumination throughout the area substantially constant even with the occurrence of abnormal light conditions from uncontrolled sources.

Another object of the present invention is to provide a system which achieves the above object but which is capable of controlling the relative importance or effect of uncontrolled and controlled light on the response of the system so that the system may be made less reactive to conditions which do not occur throughout the entire area.

A further object of the present invention is to provide such a system which is relatively inexpensive to manufacture, durable in use and which may be easily incorporated into existing systems.

In carrying out the present invention, the area, which may be a room, is provided with a source of artificial light, such as a plurality of ceiling fixtures which are so located as to provide a relatively uniform quantity of light throughout the area. The artificial source is energized by electric power through an automatic power control component which by varying the power across the source relatively varies the quantity of light from the source. Additional light may be supplied to the area by natural or exterior sources through windows or by other illuminating devices, such as table lamps, that are not connected to have their voltage or placement controlled. A photocell is positioned, generally in the ceiling, to receive reflected light and thereby sense the total illumination in the area with the quantity of light impinging thereon causing a change in one of its characteristics. The change in the characteristics is employed to control the power, i.e. voltage to the artificial source and hence the quantity of light therefrom.

In both systems disclosed in the above-noted patents, the photocell is incorporated into a bridge network which normally is balanced. When the quantity of light impinging on the photocell changes, it unbalances the bridge producing a signal to alter the quantity of artificial light until the bridge becomes balanced again by light change being balanced by a change in the quantity of output light. The light received by the photocell may include that from the controlled source which is usually reflected light and light that is reflected or direct from other sources. The photocell sensing face is quite small and does not extend over the entire area so that a small reflection or direct impingement of light thereon produces a change with the change not being truly representative of the total illumination throughout the area. Accordingly, the photocell could cause the system to inaccurately respond by darkening the whole area below that quantity of illumination which is desired.

In accordance with the present invention, the photocell is also used in a bridge but is made more responsive to the quantity of artificial or controlled light. In both hereinafter disclosed embodiments, the effect of such abnormal conditions on the photocell is reduced by providing a signal which is related to the quantity of controlled illumination being supplied. In one embodiment the signal is an electrical signal that is in opposition to the bridge signal so that under a normal balanced light condition, the output signal from the bridge is balanced against the controlled source signal. A change in light on the photocell will cause an unbalance between the two signals effecting a change in the quantity of light from the controlled source. But as the latter is changed, it also changes its signal in a direction to overcome the difference while the bridge is also changing its signal in the opposite direction but also in a direction to overcome the difference or system unbalance. Thus the two opposing signals will balance at a light level which is nearer the desired level throughout the room while still accommodating for the light added by the external source.

In another embodiment, the photocell is also provided with a signal that is related to the value of the quantity of light from the controlled source. Rather than being an electrical signal, it consists of a bulb or light source whose amount of light is varied directly with the light from the controlled source and which is placed sufficiently near the photocell to influence the photocell to cause it to be less responsive to an abnormal change in light impinging thereon. Thus in both embodiments, while each system permits an abnormal condition to alter the quantity of light from the controlled source to maintain the total illumination substantially constant, it prevents a change which could be so drastic as to be unsatisfactory over the entire area.

Other features and advantages will hereinafter appear.

Figure 2:
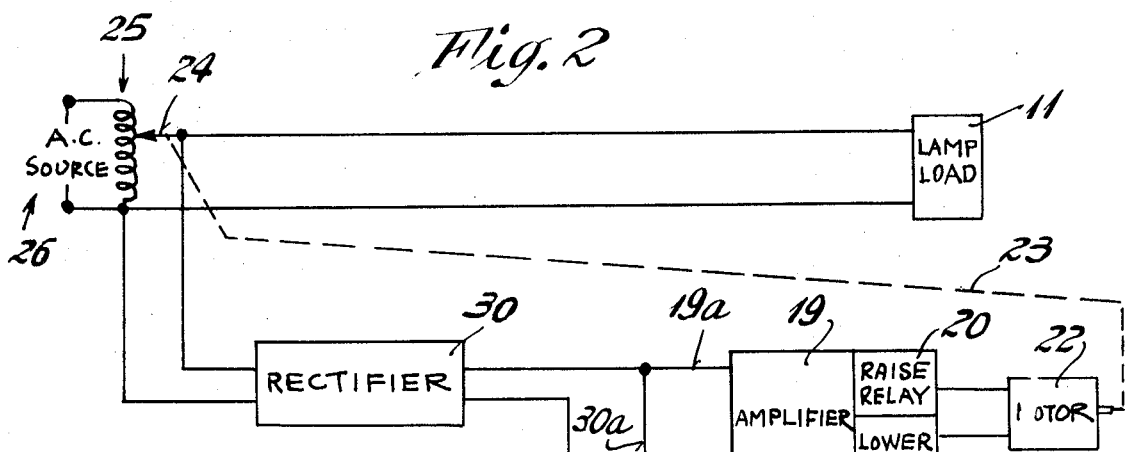
FIG. 2 is a block and schematic diagram of the system.

Referring to the drawing, the system is generally indicated by the reference numeral 10 and includes, as shown in FIG. 2, a source of controlled light 11, denoted a lamp load which produces artificial light when electrically energized. A photocell 12 is employed to sense the total quantity of light in a room or area 13 while an adjustable resistance 14 enables a user to select the desired quantity of light which is to be maintained substantially constant.

Figure 1:
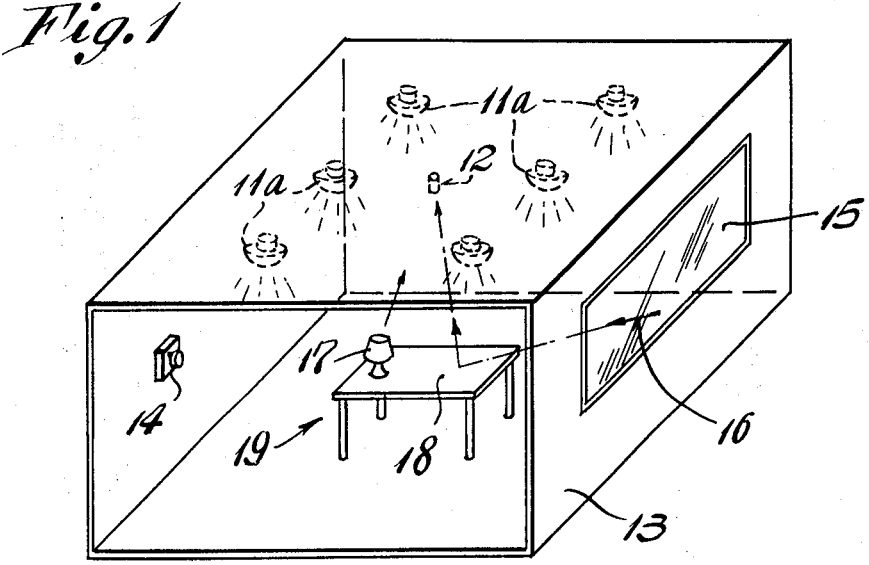
FIG. 1 is a schematic representation of an area in which the automatic illumination control system is employed.

The lamp load, as shown in FIG. 1, may consist of a plurality of electric light ceiling fixtures 11a spaced throughout the area 13 to provide somewhat constant illumination therein by each producing the same amount of illumination. The photocell 12 is preferably mounted somewhere in the middle of the area, also in the ceiling, so as to be responsive to total illumination in the area while the adjustable control 14 may be positioned on a wall or other convenient location. The room 13 further may include a window 15 by which exterior light 16 may enter into the area. In addition, there may be a lamp 17 within the room which is not part of the system but which when used adds illumination. The exterior light and the light from the lamp 17 or any other light source are generally referred to as sources of uncontrolled light as the system does not alter the quantity of light therefrom but instead regulates the total illumination by controlling the amount from the controlled source 11.

While the above system will function as disclosed in the above-noted patents, it has been found that if the external light 16, for example should strike a reflective surface 18 of a table 19 and reflect directly onto the photocell 12, that the photocell 12 would sense this light and change its characteristics to require the controlled source to decrease its quantity of light. This would produce too little light in the other portion of the area. Additionally, if the lamp 17 should be placed to have its light directly impinge on the photocell 12 and not diffuse the same quantity substantially throughout the room, an insufficient or lower than desired level of total illumination would occur in the other portion of the area.

The photocell 12 is connected to control through an amplifier 19 a raise relay 20 and a lower relay 21 which in turn control a reversible electric motor 22. The motor, as shown by the dotted line 23, is connected to a brush 24 of an autotransformer 25, with the latter having its input connected to an AC source 26. The lamp load 11 is connected to the output of the autotransformer 25 and thus will have a voltage impressed thereacross which is dependent upon the position of the brush 24. Any energization of the motor will accordingly change the brush portion and hence the voltage across the lamp load.

The voltage to the lamp load primarily determines the quantity of illumination therefrom and thus by energizing the motor 22, the quantity of illumination from the artificial source may be altered. Particularly the illumination will be increased when the raise relay 20 is operated while it will be decreased when the lower relay 21 is operated.

The operation of the relays 20 and 21 is determined by a bridge circuit 27 which includes the photocell 12 and the adjustable control 14 in two legs and resistances 28 and 29 in the other leg. The photocell 12 is of the photoconductive type in that it will change its resistance inversely with the quantity of light impinging thereon and as such would tend with a change in light to cause an unbalance of the bridge. The unbalance of the bridge will result in a signal having a value and polarity which is related to the resistance of the photocell, which is unidirectional by reason of the bridge being energized with DC and its value will change in a direction indicative of the direction of the change of the photocell resistance.

Also connected to the output of the autotransformer 25 is a rectifier 30 which applies a unidirectional current to an adjustable potentiometer 31 having a tap 32 connected to one output 27a of the bridge. The rectifier 30 supplies across the potentiometer 31, a voltage which is proportional to the voltage across the lamp load 11 and this voltage is applied in the manner which has its polarities as shown so that a lead 30a is negative and a lead 30b is positive.

The amplifier 19 has a lead 19a connected to the lead 30a and a lead 19b connected to the other output terminal 27b of the bridge. The amplifier 19 functions to operate the raise relay 20 whenever the lead 19a is more positive than the lead 19b and reversely to operate the lower relay 21 whenever the lead 19b is more positive than the lead 19a, it being understood that both leads may have a negative voltage with the one having the lesser negative voltage being the more positive.

In the operation of this circuit, assuming that the system is balanced, by the total illumination in the room being that set by the adjustable resistor 14, the bridge is unbalanced producing a negative voltage on the lead 19b which is substantially equal in quantity to the negative voltage in the lead 19a. This latter voltage is the sum of the positive voltage at the output junction 27a of the bridge and the negative voltage between the tap 32 and the lead 19a. As neither lead 19a or 19b has a more positive voltage, the motor 22 is not energized and the output from the lamp load 11 is maintained constant. If the quantity of exterior light, as from the lamp 17 being energized or the ray 16 increases so as to increase the total quantity of illumination in the room from that set by the adjustable potentiometer 14, the bridge will become less unbalanced by the photocell 12 decreasing its resistance by reason of the increase in light sensed thereby. The decrease in resistance changes the unbalance in the bridge and will cause the lead 19b to decrease its negative potential (i.e. increase relatively positively in voltage) while relatively decreasing the positive voltage at the junction 27a.

The lead 19a has the negative voltage from the rectifier 30 applied thereto less the lesser positive voltage from the junction 27a, and it will become greater negatively than the lead 19b. As the lead 19b is thus more positive than the lead 19a it will cause operation of the lower relay 21 to decrease the voltage across the lamp load 11 and subsequently decrease the total illumination in the area.

As the illumination from the lamp load decreases, the photocell resistance increases to increase the negative potential in the lead 19b with respect to junction 27a. Moreover, the negative potential in the lead 19a is decreased by two factors, the increasing positive voltage at the junction 27a and the decreasing negative potential in lead 30a. When the voltage across the lamp load has decreased sufficiently so that the leads 19a and 19b have a substantially equal negative voltage with respect to the junction 27a, the lower relay will become deenergized, the motor stopped and the system will be in balance as to the total illumination.

For the other condition where there is a decrease in the total amount of light, the bridge will become more unbalanced, increasing the negative voltage on the lead 19b while decreasing the negative voltage on the lead 19a, causing the raise relay to operate and the motor to be energized to increase the voltage across the lamp load. The increasing illumination from the controlled source 11 decreases the unbalance of the bridge while increasing the negative potential in the lead 30a until the system becomes balanced by both leads 19a and 19b having essentially the same negative value of voltage.

It will be understood that the potentiometer 31, by the setting of its tap 32, will serve to control the relative importance between the voltage derived from the lead 30a and the voltage of the bridge. By moving the tap downward, the voltage in the lead 30a will increase in importance by it increasing in value while the opposite movement of the tap will reduce the voltage in the lead 30b, making the voltage at the junction 27a of greater importance.

Figure 3:
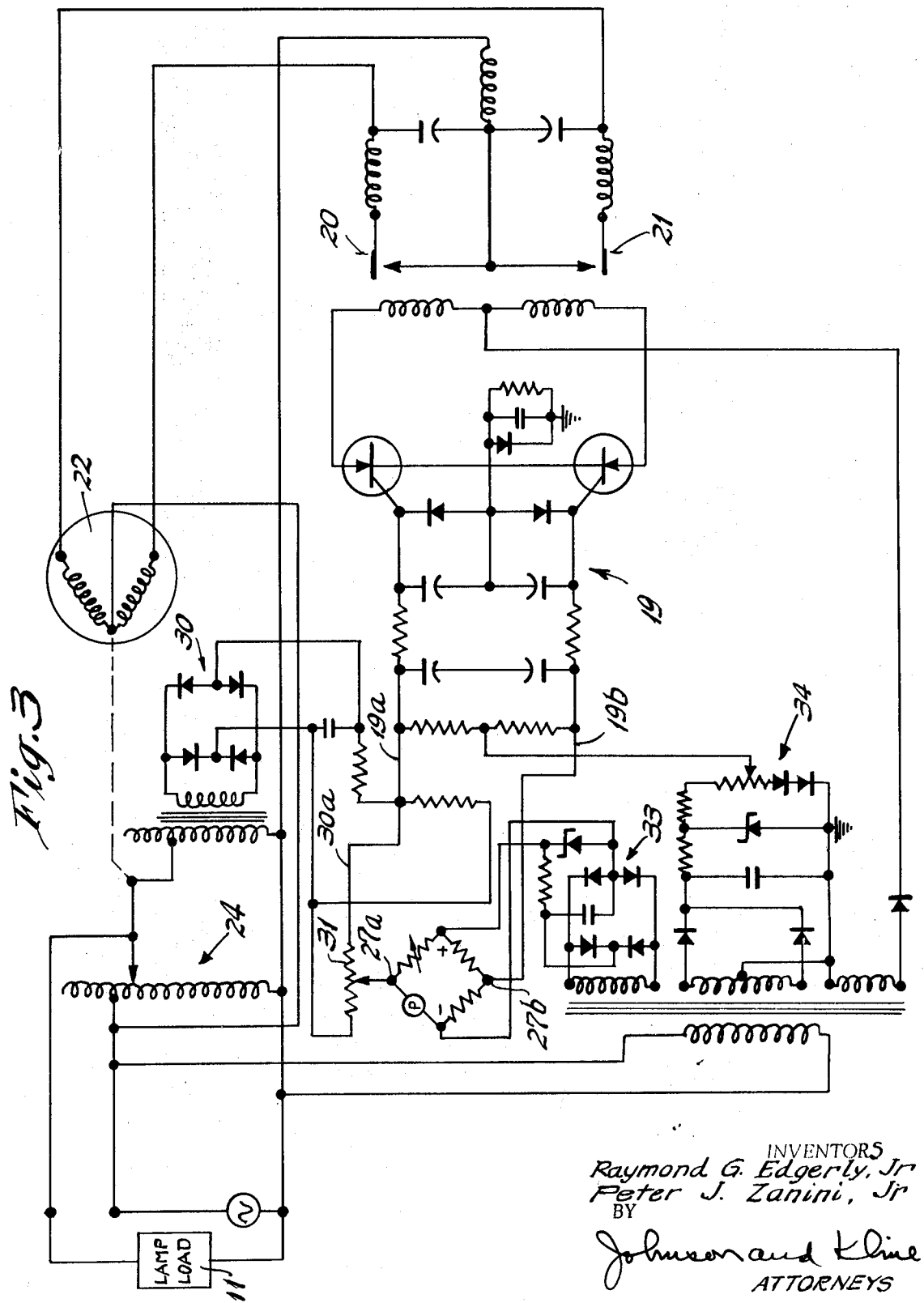
FIG. 3 is an electrical schematic diagram of the system.

Shown in FIG. 3 is an electrical schematic diagram of the components of the system. The circuit includes the autotransformer 24, the lamp load 11, the motor 22, the raise relay 20 and the lower relay 21. The amplifier 19 has input leads 19a and 19b that are connected to the lead 30a and the junction 27b. The DC for the bridge is from a rectifier circuit 33 while another DC circuit 34 provides a bias potential to the amplifier. The above circuit is essentially similar to that disclosed in the above-noted U.S. Pat. No. 3,312,891 and reference is made thereto for a further description of the operation of the various components.

Figure 4:
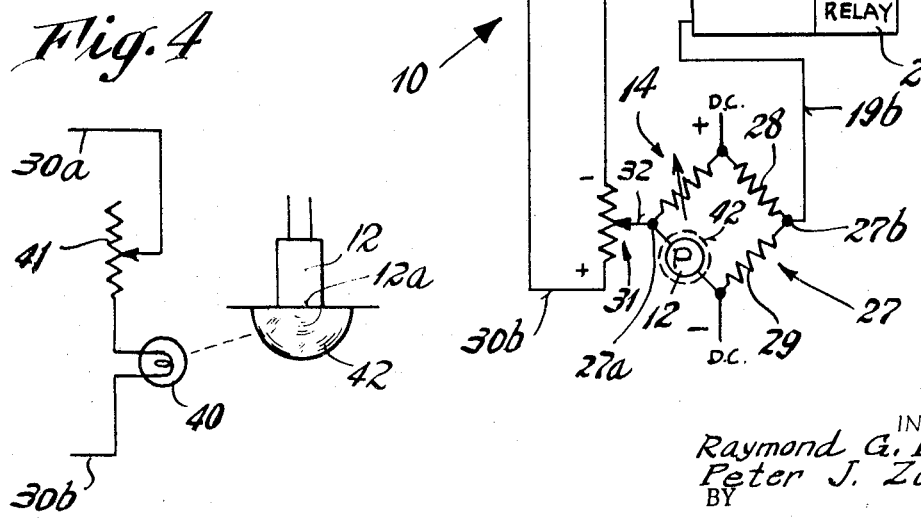
FIG. 4 is a diagrammatic representation of another embodiment of the present invention.

The above-described embodiment uses an electrical signal to supply the influence of the actual amount of light being supplied by the controlled source in the system. Shown in FIG. 4 is another embodiment in which a light signal is employed. The photocell 12 is diagrammatically shown positioned with respect to an electric bulb 40 so that the cell receives light from the bulb as well as the total illumination in the area. The bulb is connected through an adjustable resistance 41 to the lead 30a and also the lead 30b. The power that the bulb 40 will receive is thus related to the amount of power supplied the lamp load and it will provide light to the photocell in direct proportion thereto. The relative importance of the light may be controlled by the resistance 41 in the same manner as the resistor 31 controls in the first described embodiment. The bridge in this embodiment is essentially balanced when the system is stabilized in that the leads 19a and 19b have essentially zero potential as the junction 27a is connected to the lead 19a. When the total illumination is decreased by a change in the uncontrolled source, the lead 19a becomes positive actuating the raise relay while for an increase in the total illumination, the lead 19b becomes positive actuating the lower relay. The relays will be energized, changing the amount of controlled light until the bridge becomes essentially balanced, when the relays are deenergized.

The photocell 12 may be of conventional construction and has a flat sensing face 12a. When positioned as shown in FIG. 1, the part of the area to which the face 12a is responsive, is basically a cone with the face as the apex and it is quite directional in that it responds most to light rays substantially perpendicular thereto. Light from the controlled light source will thus not generally directly impinge on the face. To increase the ability of the face to be responsive to a light over a larger area than just the cone, a diffuser 42 may be positioned adjacent the cell. The diffuser may be formed of translucent plastic or frosted glass and be hemispherical in shape. Light may thus strike the diffuser from many angles and illuminate it in proportion to the total light it receives with its luminosity being that to which the photocell is responsive. One particular advantage found to be derived from the use of the diffuser 42 is that it renders the system less sensitive to the type of fixture in which the controlled light source is mounted.

It will accordingly be appreciated that there has been disclosed an automatic light control system for maintaining substantially constant the total illumination in an area, such as a room. The illumination consists of at least light supplied by a controlled source and normally light supplied by a source or sources which are uncontrolled by the system. The amount of total illumination is sensed by a photocell and the latter responds to a change to produce an altering in the quantity of light from the controlled source by altering the electric power thereto. For preventing an abnormal condition sensed by the photocell from seriously upsetting the balance of the system, the present invention employs a feedback signal which is related to the amount of light produced by the controlled source. In this manner, though the photocell will respond to an abnormal condition, the feedback signal prevents such an excessive response as would substantially alter the total illumination from the value to which it was set.

Variations and modifications may be made within the scope of the claims and portions of the improvements may be used without others.

We claim:

1. An automatic illumination control system for maintaining substantially constant the total illumination in an area wherein the illumination is derived from controlled and uncontrolled sources comprising a source of alternating power connected to said controlled source by a common terminal and a tap variable in position across said source for selecting a voltage corresponding to a predetermined total illumination level, a rectifier connected to said tap and common terminal to have a unidirectional voltage on its output leads directly related to the voltage between said variable tap and common terminal, a resistor having an adjustable tap connected across the output leads of said rectifier, a photocell positioned in the area to sense the total illumination therein, said adjustable tap being at the junction of two legs of a bridge circuit, one of said legs including said photocell, said bridge circuit further having intermediate junctions respectively connected between the positive and negative terminals of a unidirectional voltage source, and an opposite junction, the photocell sensing signal between said junction and said opposite junction being in opposition to the voltage at one of said rectifier output leads, said signal being the algebraic sum of the sensing signal and the adjusted voltage from said rectifier means, and means responsive to said signal for controlling the position of said variable tap, said means being connected between said junction and said one of said rectifier output leads.

2. An automatic illumination control system for maintaining substantially constant the total illumination in an area wherein the illumination is derived from controlled and uncontrolled sources comprising a source of alternating power connected to said controlled source by a common terminal and a tap variable in position across said source for selecting a voltage corresponding to a predetermined total illumination level, a rectifier connected to said tap and common terminal to have a unidirectional voltage on its output leads directly related to the voltage between said variable tap and common terminal, a variable resistor in series with a light bulb connected across the output leads of said rectifier, a photocell positioned in the area to sense the total illumination therein, said photocell being included in the leg of a bridge circuit having two pairs of opposite junctions, means for connecting the junctions of one pair respectively between the positive and negative terminals of a unidirectional voltage source, and means connected to the junctions of the other pair for deriving a control voltage therefrom and for controlling the position of said variable tap in response thereto, and means for locating the light bulb adjacent the photocell to have its light directed toward the photocell together with the total illumination in the area and in which the photocell has a small sensing area that is directionally responsive to light rays perpendicular thereto and in which diffusing means of translucent material in the form of a hemisphere is positioned about the sensing area of the photocell, said control voltage having a magnitude and polarity determined by variations of said total illumination from said predetermined total illumination level, whereby said variable tap is positioned to compensate for such variations.